United States Patent [19]

Singleton et al.

[11] 3,925,534

[45] Dec. 9, 1975

[54] TREATMENT OF CEMENT KILN FLUE DUST

[75] Inventors: Frank Henry Singleton, Croydon; Jack William Bruce, Lindfield, both of England

[73] Assignee: Woodall-Duckham, Limited, Crawley, England

[22] Filed: Sept. 4, 1973

[21] Appl. No.: 393,805

[30] Foreign Application Priority Data

Sept. 4, 1972 United Kingdom............... 40939/72

[52] U.S. Cl. ............... 423/208; 423/432; 423/499; 423/551

[51] Int. Cl.$^2$. C01F 11/18; C01D 3/04; C01D 5/00; C22B 7/02

[58] Field of Search ........... 423/499, 432, 551, 552, 423/208

[56] References Cited

UNITED STATES PATENTS

| | | | |
|---|---|---|---|
| 1,345,034 | 6/1920 | Stringfield | 423/551 X |
| 1,372,193 | 3/1921 | Roon | 423/432 |
| 1,465,833 | 8/1923 | Anderson | 423/499 X |
| 1,465,834 | 8/1923 | Anderson | 423/499 X |
| 1,465,907 | 8/1923 | Huber | 423/499 X |
| 2,058,503 | 10/1936 | Rafton et al. | 423/432 |
| 2,198,640 | 4/1940 | Stump | 423/432 |
| 2,617,711 | 11/1952 | McAllister | 423/432 X |
| 2,991,154 | 7/1961 | Patzias | 423/551 X |
| 3,304,154 | 2/1967 | Kiouzes-Pezas | 423/432 |

FOREIGN PATENTS OR APPLICATIONS 1,131,354  10/1968  United Kingdom

*Primary Examiner*—Edward Stern
*Attorney, Agent, or Firm*—Parmelee, Miller, Welsh & Kratz

[57] ABSTRACT

This invention concerns a cement kiln flue dust treatment process comprising: in a first stage treating the dust with fresh water at an elevated temperature for such time as to dissolve the alkali metal chlorides, simultaneously carbonating to convert calcium hydroxide in solution to insoluble calcium carbonate, then treating the slurry thus formed in a second stage with additional water at an elevated temperature and for such time as to dissolve substantially all the remaining alkali metal sulphates, again simultaneously carbonating to convert calcium hydroxide in solution to the insoluble calcium carbonate, filtering the slurry from the second stage, and recovering potassium chloride and potassium sulphate as desired from the filtrate.

10 Claims, 2 Drawing Figures

3,925,534

TREATMENT OF CEMENT KILN FLUE DUST

BACKGROUND OF THE INVENTION

This invention concerns the treatment of inorganic dust, more particularly flue dust resulting from the manufacture of cement clinker.

In the manufacture of cement clinker there is produced in the kiln a large quantity of dust which can cause considerable atmospheric pollution if released to the atmosphere and which therefore usually has to be separated from the kiln flue gases by means such as, for example, a "Cottrell Precipitator". The recovered flue dust may amount to several percent by weight of the raw material fed to the kiln and its disposal not only involves handling problems and additional cost but also represents a waste of the raw material fed to the kiln.

It is not practical directly to recycle the recovered dust by feeding it to the kiln with the normal feed materials since the dust as recovered contains relatively large proportions of the alkali metals sodium and potassium (the latter usually predominating) in the form of oxides and/or salts thereof (for example as chlorides and sulphates) that were volatilised in the kiln and then condensed on the dust particles leaving the kiln in the flue gases thereof. If this dust with its substantial content of alkali metal were directly recycled to the kiln, the proportion of alkali metal in the feed to the kiln would be increased and the equilibria within the kiln disturbed.

DESCRIPTION OF THE INVENTION

It is an object of the present invention to provide a process for the treatment of cement kiln flue dust for extraction of alkali metal, particularly potassium, therefrom in a manner that provides for recovery of the extracted alkali metal as a valuable product and which enables the residue of the treated dust to be recycled to the kiln without adverse effect upon the operation thereof.

Viewed from one aspect, the present invention provides a cement kiln flue dust treatment process comprising first treating the dust with fresh water at an elevated temperature for such time as to dissolve the alkali metal chlorides, simultaneously carbonating to convert calcium hydroxide in solution to insoluble calcium carbonate, then treating the slurry thus formed in a second stage with additional water at an elevated temperature and for such time as to dissolve substantially all the remaining alkali metal sulphates, again simultaneously carbonating to convert calcium hydroxide in solution to the insoluble calcium carbonate, filtering the slurry from the second stage, and recovering potassium chloride and potassium sulphate as desired from the filtrate.

The said fresh water is, for example, so-called "towns water" or "process water".

Desirably the solid matter resulting from the said filtration step is washed with water to free it substantially from mother liquor adhering thereto.

Whilst the said additional water for use in the second stage may be fresh or "process" water, desirably, in order to minimize the total amount of water used in the process, at least part of the water used in the second stage comprises recycle water in the form of filter cake wash liquor, that is, the water which has been used to wash the solid matter resulting from the filtration step.

The said second stage may be performed in one or more vessels as desired to ensure the required dissolution of the said alkali metal salts, water being introduced into the or at least one of the said vessels of the second stage, such water conveniently comprising at least partially the said water which has been used to wash the solid matter resulting from the filtration step, and carbon dioxide being introduced into the or each vessel of the second stage.

The residue of the treated dust may be recycled to the kiln without adverse effect on the operation thereof.

The first stage of treatment of the dust with fresh or "process" or "towns" water should be accomplished at a temperature that will lead to conveniently rapid dissolution of the appropriate alkali metal chlorides and conveniently a temperature within the range 40° to 90° C, preferably around 60° C, will be maintained, for example by the addition of steam. The said first stage is comparatively short and will normally take about 5 to 20 minutes.

The second stage should be accomplished at a temperature that will lead to conveniently rapid dissolution of substantially all the remaining alkali metal sulphates and will normally be carried out at a higher temperature, for example, within the range 70° to 100°C, conveniently 80° to 90°C, and will normally taken longer, for example between 30 minutes and 3 hours, for instance, 1 hour, than the first stage.

It will be appreciated that the treatment with carbon dioxide at the first stage causes some or all of the dissolved calcium to be insolubilised as the carbonate so as to form part of the solid residue, the treatment with carbon dioxide also in the second stage serving to insolubilise any further quantities of calcium released by the dissolution of the potassium sulphate in the second stage. Thus, generally the calcium content of the dust will to a substantail extent be constituted by particles of lime coated with alkali metal salts which will be released upon dissolution of the latter. Accordingly insolubilisation of calcium values in the first stage by treatment with carbn dioxide will not prevent release of further calcium values when the slurry from the first stage is subsequently treated with the said additional water and further treatment with carbon dioxide during the second stage prevents calcium values released at this time from "blinding" the alkali salts by precipitating calcium sulphate.

Conveniently the source of the said carbon dioxide used in the first and/or second stages is cement kiln stack gas. This has the additional advantage of providing all or some of the heat to raise the temperature in the first and/or second stages.

The invention also extends to apparatus for use in carrying out the process of the invention and to alkali metal salts when recovered using the said process.

BRIEF DESCRIPTION OF THE DRAWINGS

In order that the invention may be more readily understood one embodiment of the same will now be described by way of example and with reference to the accompanying drawings in which.

OPERATION OF THE INVENTION

Figure 1:
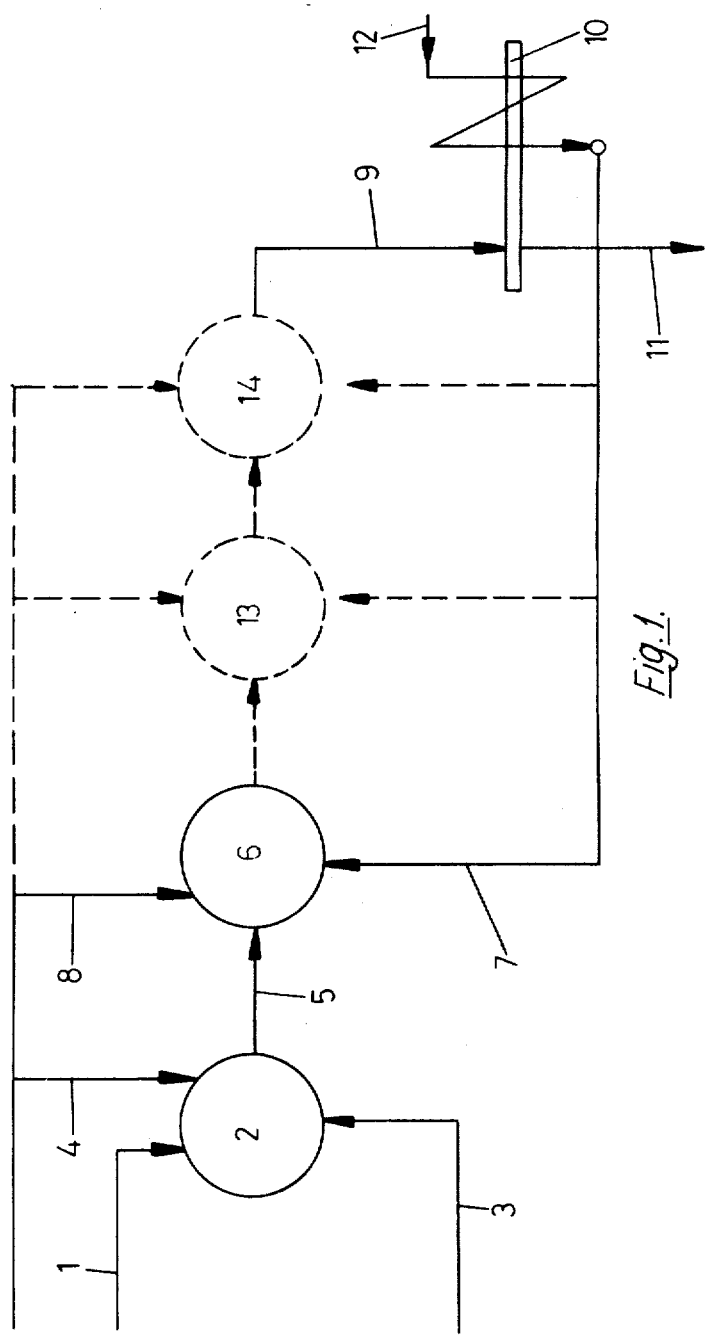
FIG. 1 is a diagramic flow sheet illustrating one embodiment of the process of the invention.
Figure 2:
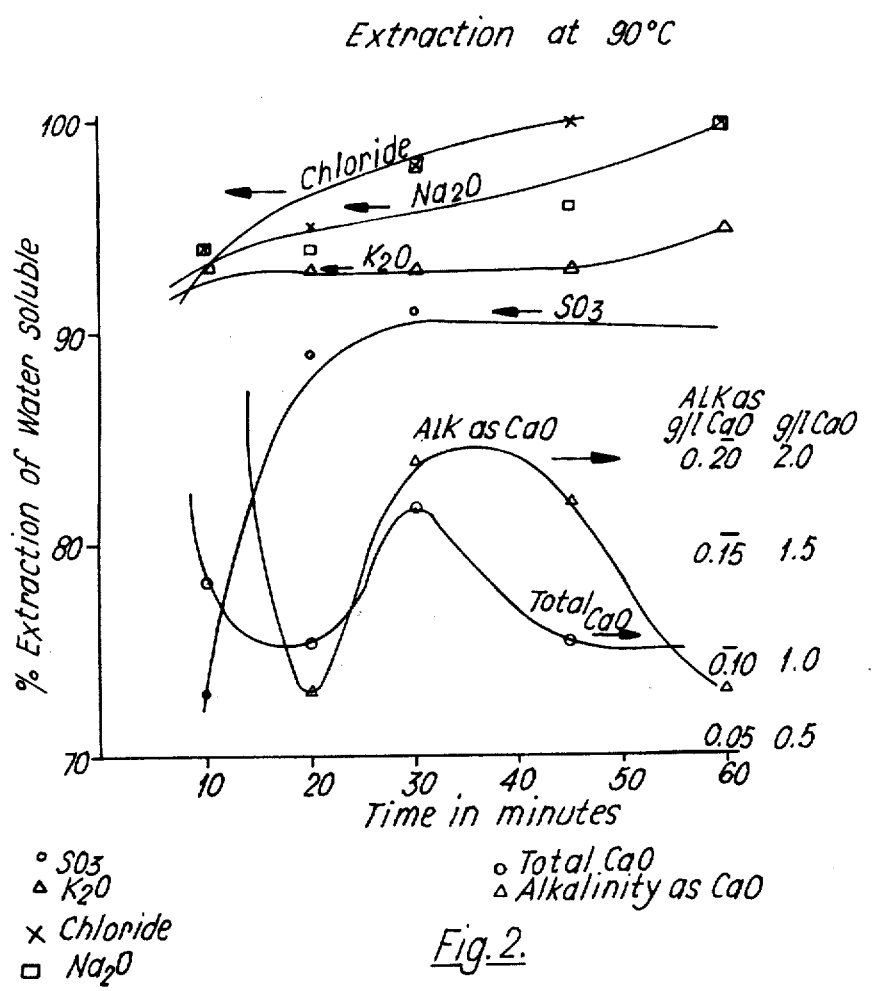
FIG. 2 is a graph in which, in carrying out the process of FIG. 1, the percentage by weight extraction has been plotted against the time in minutes at an extraction temperature of 90°C.

In this embodiment the process is intended for continuous operation with a cement kiln flue dust containing for example:

| | |
|---|---|
| Potassium as $K_2O$ | 8 – 15% by weight |
| Chloride as Cl | 2 – 7% by weight |
| Sulphate as $SO_3$ | 6 – 10% by weight |
| Sodium as $Na_2O$ | 0.8 – 2.5% by weight |
| Water insoluble solids (including lime) | 70 – 85% by weight |

The said dust is fed as indicated at 1 into a vessel 2 and is treated in a first stage with fresh or "process" or "towns" water which is also fed via pipeline 3 into the vessel 2 in a weight ratio of approximately 1:2 dust feed: water, the temperature being maintained at about 60°C. Simultaneously carbon dioxide, conveniently contained in cement kiln stack gas, is passed via pipe 4 into the vessel 1 and through the mixture, such first stage serving to dissolve the bulk of the alkali metal chlorides and some of the alkali metal sulphates from the dust while the calcium hydroxide is converted in solution to insoluble calcium carbonate.

After a comparatively short time, for example 5 to 20 minutes, the first stage is completed and the slurry thus produced is passed as indicated at 5 without filtration to a second stage where it is treated in a vessel 6 with additional water, that is recycle water introduced through line 7 and the source of which will be decribed hereinafter. Again carbon dioxide is passed through the mixture via pipe 8, the source of which carbon dioxide may be optionally cement kiln stack gas. During the second stage substantially all (e.g. 97%) of the alkali metal sulphates are dissolved while the carbonation serves to insolubilize further calcium values.

This second stage is carried out at a temperature of approximately 80° – 90°C, and the slurry thus produced is filtered by being passed as indicated at 9 to a filter 10, the filtrate being led off through pipe 11 and crystallized or evaporated to recover potassium chloride and potassium sulphate therefrom, either separately or together as required.

The solid matter remaining on the filter 10 during the filtration step is washed using fresh or "process" or "towns" water, introduced at 12, such washing serving to remove from the solid matter the mother liquor adhering to the latter and which contains soluble alkali metal salts. The amount of washing water used may, for example, be sufficient to displace the mother liquor and to provide a quantity of filter cake wash liquor approximately one quarter of the quantity of water introduced in the first stage. Such filter cake wash liquor or water forms the recycle water for passing to the vessel 2 as above described. If desired, the said recycle water may be supplemented with fresh or "process" or "towns" water.

The washed solid matter or treated dust may be recycled to a cement kiln with the normal feed thereto and is conveniently pulped by the addition of water or pelletized to make it suitable for such recycling.

The said second stage may be performed in one or more vessels as desired, that is additional vessels 13 and 14 may be used as indicated in broken lines in FIG. 1, the time and temperature of treatment varying depending upon the rates of dissolution. In each case the slurry is passed successively from one vessel to the next seriatim until it is passed from the last vessel of the second stage to the said filtration step. The said recycle water may be introduced into any or each vessel of the second stage but not into the first said stage. Carbon dioxide is introduced into each vessel of the second stage.

Supplemental means, for instance steam addition, may be used to maintain the desired elevated temperatures in the first and second stages.

In the accompanying graph the percentage by weight extraction has been plotted against the time in minutes at an extraction temperature of 90°C.

What is claimed is:

1. A process of treating cement kiln flue dust, said dust containing lime and the chloride and sulphate salts of sodium and potassium, said process comprising:
    a. in a first stage, forming a slurry in a first vessel by mixing the dust with fresh water at a temperature within the range of 40° to 90°C. for about 5 to 20 minutes to dissolve substantially all of the sodium and potassium chlorides, while simultaneously contacting the slurry with a carbon dioxide containing gas so as to convert, to insoluble calcium carbonate, substantially all of the soluble lime and the lime solubilized upon dissolution of the said chlorides;
    b. in a second stage, treating in a second vessel the slurry of said first stage with additional water at a temperature within the range of 70° to 100°C. for between 30 minutes and 3 hours to dissolve substantially all of the sodium and potassium sulphates, while simultaneously contacting the slurry with a carbon dioxide containing gas so as to convert substantially all of the lime that is solubilized upon dissolution of the said sulphates to insoluble calcium carbonate; and
    c. filtering the slurry from said second stage to obtain an insoluble residue and a liquid filtrate containing dissolved chloride and sulphate salts of sodium and potassium.

2. The process of claim 1 in which the residue resulting from said filtration step is washed with water to free it substantially from mother liquor adhering thereto.

3. The process of claim 1 in which in order to minimize the total amount of water used in the process, at least part of the water used in the second stage comprises recycle water in the form of filter cake wash liquor, that is, the water which has been used to wash the residue resulting from the filtration step.

4. The process of claim 3 in which said additional water comprises at least partially said water which has been used to wash the residue resulting from the filtration step.

5. The process of claim 1 in which the residue of the treated dust is recycled to the kiln.

6. The process of claim 1 in which said temperature is around 60°.

7. The process of claim 1 in which the required temperature in the first stage of treatment is maintained by the addition of steam.

8. The process of claim 1 in which said temperature is 80° to 90°C.

9. The process of claim 1 in which the source of carbon dioxide containing gas to effect the conversion of lime to calcium carbonate is cement kiln stack gas.

10. The process of claim 1 including the further step of recovering potassium chloride and potassium sulphate from said filtrate.

* * * * *